Oct. 30, 1951    S. RAMIREZ    2,573,357
AUTOMATIC FISHING DEVICE

Filed March 29, 1949    2 SHEETS—SHEET 1

INVENTOR.
SALVADOR RAMIREZ,
BY
McMorrow, Berman & Davidson
ATTORNEYS.

Oct. 30, 1951 S. RAMIREZ 2,573,357
AUTOMATIC FISHING DEVICE
Filed March 29, 1949 2 SHEETS—SHEET 2

INVENTOR.
SALVADOR RAMIREZ,
BY
McMorrow, Berman & Davidson
ATTORNEYS.

Patented Oct. 30, 1951

2,573,357

UNITED STATES PATENT OFFICE 2,573,357

AUTOMATIC FISHING DEVICE

Salvador Ramirez, Chicago, Ill.

Application March 29, 1949, Serial No. 84,073

2 Claims. (Cl. 43—15)

1

This invention relates to an automatic fishing device, and more particularly to an automatic fishing device for a trolley line used in fishing.

It is an object of this invention to provide a spring arm connected to a fishing or hook line whereby tensioning of the fishing line will actuate a trigger to release the spring arm for swinging to jerk a hook line and thereby embed a hook on the line in the biting fish.

Another object of this invention is to provide an automatic fishing device of the kind to be more particularly described hereinafter having a sensitive trigger device for releasing the spring-pressed lever arm on which the fishing line is attached for embedding a hook in the fish.

Still another object of this invention is to provide an automatic fishing device of this kind which may be readily reset after being released by one catch, the device being light in weight, simple and efficient in operation, and sensitive for actuation by a very light drag on the fishing line.

With the above and other objects in view, my invention consists in the arrangement, combination and details of construction disclosed in the drawings and specification, and then more particularly pointed out in the appended claims.

Figure 1:
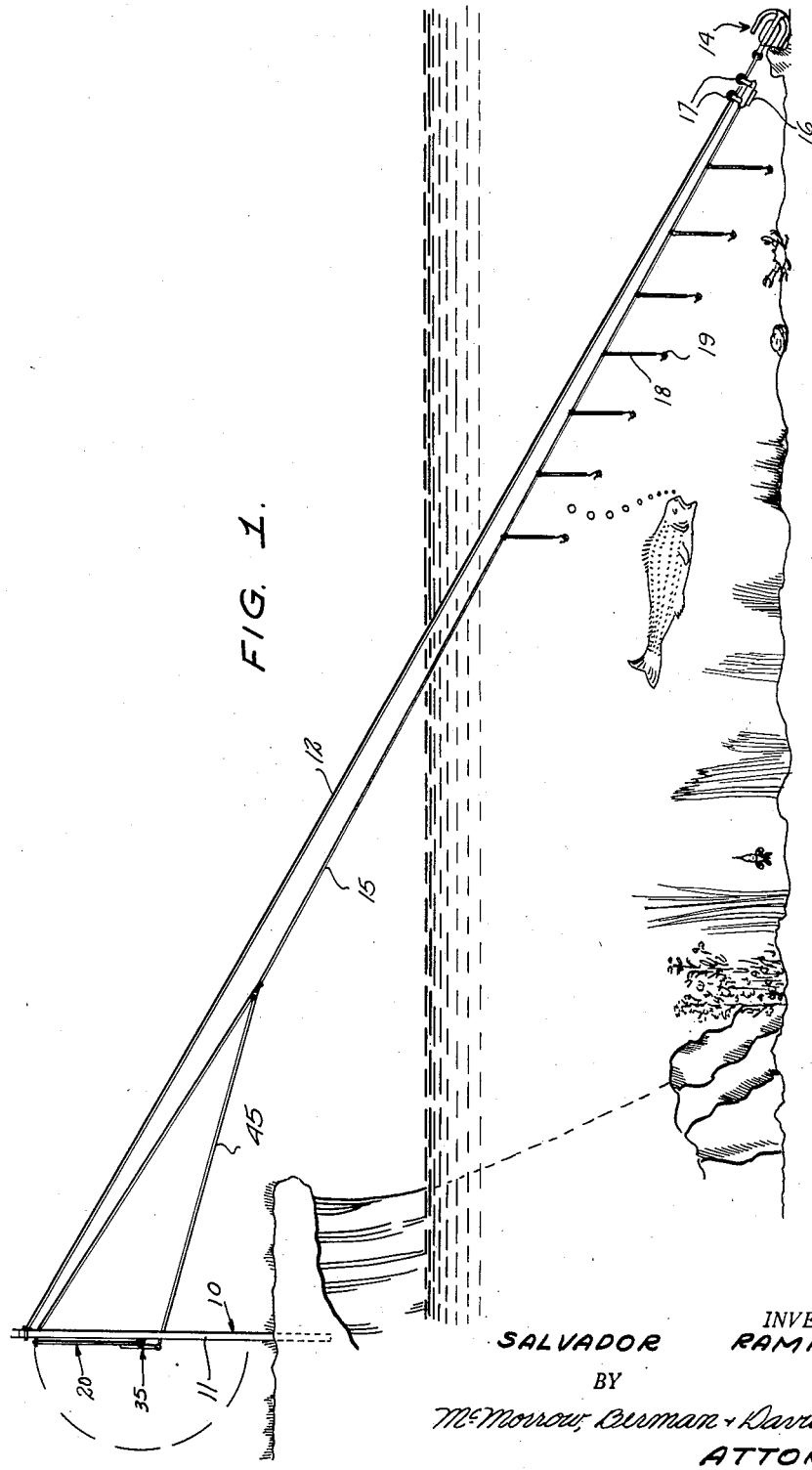
Figure 1 is a side elevation of the automatic fishing device constructed according to an embodiment of my invention, showing the extended trolley line and hook line engaged thereon, the spring-pressed arm being shown in the cocked or set position.
Figure 2:
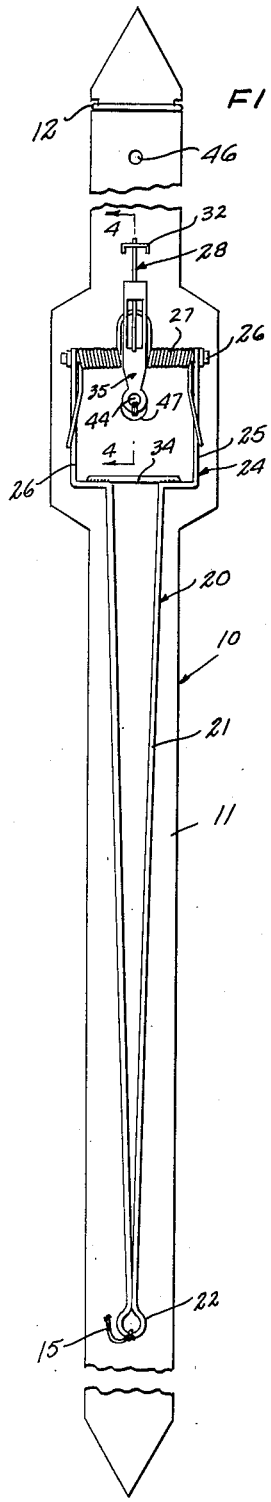
Figure 2 is a rear elevation, partly broken away, showing the automatic fishing device in the released position.
Figure 3:
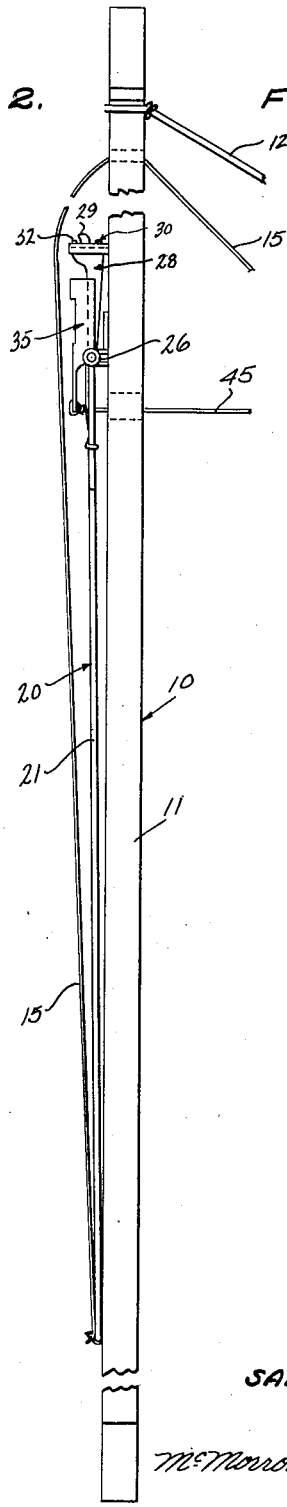
Figure 3 is a side elevation, partly broken away, of the automatic fishing device shown in Figure 2.

Referring to the drawings, the numeral 10 designates the illustrated automatic fishing device, constructed according to an embodiment of my invention. The automatic fishing device involves a supporting member 11 formed of an elongated rod or post which is adapted to be engaged in the ground in such a manner that the pole will extend vertically upwardly from the ground, being securely anchored therein. The automatic fishing device 10 is particularly designed and adapted for use with a trolley line, the trolley line being secured to the extreme upper end of the supporting member or post 11.

2

One end of the trolley line 12 is secured to the extreme upper end of the post or supporting member 11 and the major length of the trolley line is adapted to be cast or thrown outwardly from the position or point from which the fishing is to be done. A hook or anchor 14 is fixed to the extreme outer end of the trolley line 12, and in the use of the automatic fishing device 10, the anchor member 14 is initially cast off to a desired or selected position, and then the trolley line 12 is engaged or secured on the upper end of the supporting member 11. A fishing line 15 is provided with a sinker 16 at one end thereof, the sinker 16 having a pair of pulleys 17 which are adapted to be engaged on the trolley line 12 so that the sinker may be freely extended along the length of the trolley line after the latter has been secured in its desired position.

A plurality of leaders 18 having the fishing hooks 19 fixed on the lower end thereof are adapted to be secured to the outer end of the fishing or hook line 15, while the upper or inner end of the hook line 15 is adapted to be secured to the automatic fishing device 10 and the hook-snapping mechanism carried thereby.

A hook-line-engaging lever 20 is pivoted on the rear side of the supporting member 11. The line-engaging lever is formed of an elongated lever arm 20 which may be formed of a pair of spaced-apart, elongated wire members 21 secured together at their extreme outer ends in a manner to form a loop 22 on which the hook-carrying fishing line 15 is adapted to be secured. The inner or upper end of the lever 20 is formed to provide a yoke 24, having a pair of spaced-apart side arms 25 and 26. The lever arm 21 is adapted to be secured to, or formed integrally with the lower end of the yoke 24, whereas the other side of the yoke 24 is adapted to be pivotally mounted on a pivot pin 26 carried by the rear side of the supporting member 11. A helical spring 27 is circumposed on the pivot pin 26 and has an intermediate portion engaging the rear side of the post 11, and has arms at its ends engaging the side arms 25 and 26 of the yoke 24. The spring 27 tensions the lever 20 downwardly and forwardly into engagement with the post 11 below the pivot 26. In a rearwardly upswung position of the lever 20, the spring 27 is considerably tensioned, so when the lever 20 is released from the locking mechanism therefor, to be described hereinafter, the spring 27 will press the lever 20 in a pivoted manner about the pin 26.

A dog 28 is pivoted on the supporting member 11 above the pivot pin 26 on which the lever 20 is swingably mounted. The dog 28 is formed of an elongated bar or lever arm formed with a pair of upwardly-opening hooks 29 and 30 at the upper end thereof. One of the hooks, as the hook 30, is adapted to provide a pivot means for supporting the dog 28 on the supporting member 11. The hook 30 is adapted to engage on a transverse bar or pivot pin 31 carried by a pivot-pin-supporting member 32 fixed to or embedded in the supporting member 11. The other hook 29 is adapted to engage the locking bar 34 carried by the lower end of the yoke 24.

Figure 4:
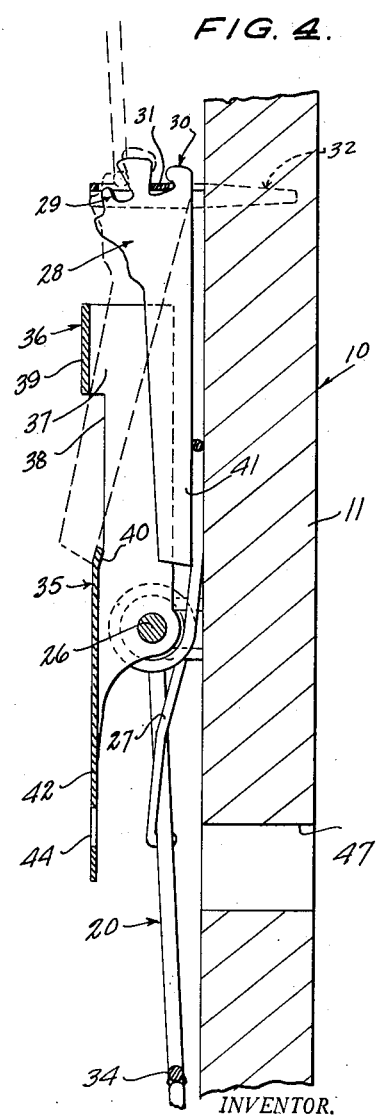
Figure 4 is a fragmentary, detail section, partly broken away, taken on the line 4—4 of Figure 2.

A trigger 35 is pivotally mounted on the pivot pin 26, for the swingable arm 20. The trigger 35 is formed as an elongated lever pivoted intermediate the length thereof. The upper arm 36 of the lever 35 is substantially U-shaped in cross-section, extending on the opposite sides of the dog 28. The lower end of the dog 28 is adapted to be loosely positioned between the side arms 37 of the U-shaped upper end of the lever 35, and to extend downwardly through an opening 38 in the bight portion 39. The opening 38 is substantially rectangular in configuration, and extends along the length of the bight portion 39 to a point adjacent the pivot pin 26. The top surface of the trigger 35, at the lower end of the opening 38, is formed with a downwardly-inclined seat 40 on which the lower end 41 of the dog 28 is adapted to be engaged in the cocked or set position of the automatic fishing device 10. The cocked position of the lever-releasing mechanism is shown in dotted lines in Figure 4 of the drawing. The lower arm 42 of the trigger 35 is formed with an opening 44 therein through which the end of the triggering line 45 is adapted to be extended for securing the ends of the triggering line 45 to the lower end of the lever arm 42 of the trigger 35.

In the use and operation of the automatic fishing device 10, the trolley line 12 is initially positioned by casting the anchor 14 outwardly from the point from which the fishing is to be conducted. With the trolley line 12 extended, the inner end of the line is secured to the extreme upper end of the supporting member 11, engaged in the ground or otherwise suitably fixed. The fishing or hook line 15 is then placed in position by engaging the pulleys 17 of the weight 16 on the trolley line 12 and letting the weight 16 roll down along the length of the trolley line. When the weight 16 has reached a determined or selected depth in the water, the upper end of the hook line 15 is extended through an opening 46 adjacent the extreme upper end of the supporting member 11. After being extended rearwardly through the opening 46, the extreme upper end of the fishing or hook line 15 is secured to the eye 22 on the outer or lower end of the lever arm 20. A trigger line 45 is then connected at one end to the lever arm 42 of the trigger 35 and at its other end to the hook line 15 adjacent the supporting member 11. With the hook line 15 extended, the trigger line 45 will normally be slightly stretched.

For cocking the fish trap 10, the lever 20 is swung rearwardly and upwardly about the pivot pin 26 and this tensions the spring 27. The lever 20 is adapted to be raised to a position in which it engages the rear surface of the supporting member 11 above the pivot 26 so that the locking bar 34 is disposed above the pivot 26 to be engaged by the hook 29 on the dog 28. For engaging the hook 29 on the dog 34, with the lever 20 in its raised position, the dog 28 is slightly raised forwardly or outwardly about the pivot pin 31 therefor. For raising the dog 28, the lower end 41 thereof is extended through the opening 38 in the trigger 35. With the dog 38 pivoted outwardly in this manner, the trigger 35 is positioned so that the seat 40 carried by the trigger 35 is disposed below the extreme lower end of the dog 28 for supporting the dog in its lever-engaging position with the hook 29 engaged on the locking bar 34. From this position, it will be seen that a pivoted movement of the lower end 42 of the trigger 35 toward the supporting member 11 will move the seat 40 downwardly and outwardly out of engagement with the locking dog 28, so that the spring tension, acting on the lever 20, will bias the dog 28 to lever-disengaging position and then snap the lever 20 from its set or cocked position downwardly for overlying the outer surface of the supporting member 11 below the pivot pin 26. In order to provide a very sensitive automatic fishing device of this kind, the trigger-actuating line 45 is extended through an opening 47 in the supporting member 11 substantially in alignment with the opening 44 in the trigger 35 so that very little friction is caused to exist on the trigger-engaging line 45.

I do not mean to confine myself to the exact details of construction herein disclosed, but claim all variations falling within the purview of the appended claims.

I claim:

1. In a fish trap, a vertical post having front and rear sides, a horizontal pivot pin mounted on the rear side of the post, a lever arm having an end pivoted on said pin and a free end, said lever arm being arranged to be swung upwardly from a depending uncocked position below said pivot pin to a cocked position above said pivot pin along the rear side of said post, a hook line extending rearwardly through a first opening provided in said post and secured at its rearward end to the free end of said lever arm, a dog pivoted on the rear side of said post above said pivot pin and arranged to engage said lever arm in its cocked position, spring means acting between said post and said lever arm and normally urging said lever arm toward the rear side of said post in the uncocked position thereof, said spring means being arranged to be tensioned by upward swinging of said lever arm to its cocked position, a trigger pivoted on said pivot pin and with which said dog is engageable whereby said dog is maintained in engagement with said lever arm so as to maintain said lever arm in its cocked position against the tension of said spring means, and a triggering line extending rearwardly through a second opening provided in said post and connected to said trigger whereby a forward pull upon said triggering line can move said trigger to release said dog from engagement with said lever arm so as to permit said spring means to swing said lever arm rearwardly and downwardly and exert a rearward pull upon said hook line.

2. In a fish trap, a vertical post having front and rear sides, a horizontal pivot pin mounted on the rear side of the post, a lever arm having an end pivoted on said pin and a free end, said lever arm being arranged to be swung upwardly from a depending uncocked position below said pivot pin to a cocked position above said pivot pin along the rear side of said post, a hook line extending rearwardly through a first opening provided in said post and secured at its rearward end to the free end of said lever arm, a dog pivoted on the rear side of said post above said pivot pin and arranged to engage said lever arm in its cocked position, spring means acting between said post and said lever arm and normally urging said lever arm toward the rear side of said post in the uncocked position thereof, said spring means being arranged to be tensioned by upward swinging of said lever arm to its cocked position, a trigger pivoted on said pivot pin and with which dog is engageable whereby said dog is maintained in engagement with said lever arm so as to maintain said lever arm in its cocked position against the tension of said spring means, and a triggering line extending rearwardly through a second opening provided in said post and connected to said trigger whereby a forward pull upon said triggering line can move said trigger to release said dog from engagement with said lever arm so as to permit said spring means to swing said lever arm rearwardly and downwardly and exert a rearward pull upon said hook line, said first opening being located in the upper part of said post above said pivot pin and said second opening being located in said post below said pivot pin.

SALVADOR RAMIREZ.

REFERENCES CITED

The following references are of record in the file of this patent:

UNITED STATES PATENTS

| Number | Name | Date |
| --- | --- | --- |
| 1,975,385 | Bachus | Oct. 2, 1934 |
| 2,100,925 | Stilson | Nov. 30, 1937 |

FOREIGN PATENTS

| Number | Country | Date |
| --- | --- | --- |
| 602,411 | Germany | Sept. 7, 1934 |
| 820,041 | France | July 19, 1937 |